US006280546B1

United States Patent
Holland et al.

(10) Patent No.: US 6,280,546 B1
(45) Date of Patent: Aug. 28, 2001

(54) METHOD OF MAKING A CUT AND ABRASION RESISTANT LAMINATE

(75) Inventors: John E. Holland, Bailey; David V. Cunningham, Rocky Mount; Connie W. Holland, Bailey, all of NC (US)

(73) Assignee: JHRG, LLC, Spring Hope, NC (US)

( * ) Notice: Subject to any disclaimer, the term of this patent is extended or adjusted under 35 U.S.C. 154(b) by 0 days.

(21) Appl. No.: 09/428,211

(22) Filed: Oct. 27, 1999

Related U.S. Application Data

(63) Continuation-in-part of application No. 08/957,431, filed on Oct. 24, 1997.

(51) Int. Cl.[7] .............................. B32B 31/26; B32B 27/12
(52) U.S. Cl. .............................. 156/85; 156/84; 156/86; 156/157; 156/160; 156/324; 442/286; 442/290
(58) Field of Search .................. 156/84, 85, 86, 156/148, 157, 158, 160, 161, 163, 164, 184, 324, 491, 502; 442/286, 288, 290

(56) References Cited

U.S. PATENT DOCUMENTS

| 3,723,234 | 3/1973 | MacDonald | 161/89 |
| 4,597,818 | 7/1986 | Aoyama et al. | 156/308.2 |
| 4,876,774 | * 10/1989 | Kavesh et al. | 28/166 |
| 4,957,804 | 9/1990 | Hendrix et al. | 428/212 |
| 4,983,433 | 1/1991 | Shirasaki | 422/36.1 |
| 5,082,721 | 1/1992 | Smith et al. | 428/252 |
| 5,160,472 | 11/1992 | Zachariades | 264/136 |
| 5,160,767 | 11/1992 | Genske et al. | 428/35.98 |
| 5,169,697 | 12/1992 | Langley et al. | 428/57 |
| 5,248,364 | 9/1993 | Liu et al. | 156/244.11 |
| 5,261,536 | 11/1993 | Wilson | 206/386 |
| 5,266,930 | 11/1993 | Garland | 428/216 |
| 5,284,540 | 2/1994 | Roth et al. | 156/160 |
| 5,286,576 | 2/1994 | Srail et al. | 428/517 |
| 5,389,448 | 2/1995 | Schirmer et al. | 428/517 |
| 5,401,344 | * 3/1995 | Dickson et al. | 156/90 |
| 5,431,284 | 7/1995 | Wilson | 206/597 |
| 5,443,874 | 8/1995 | Tachi et al. | 428/36.7 |
| 5,445,883 | 8/1995 | Kobayashi et al. | 428/355 |
| 5,460,884 | 10/1995 | Kobylivker et al. | 428/373 |
| 5,677,029 | * 10/1997 | Prevorsek et al. | 428/113 |

FOREIGN PATENT DOCUMENTS

| P4441842.6 | 11/1994 | (DE) | D06N/7/00 |
| 0088072 | 8/1978 | (JP) . | |

* cited by examiner

*Primary Examiner*—Michael W. Ball
*Assistant Examiner*—Jessica Rossi
(74) *Attorney, Agent, or Firm*—Rhodes & Mason, P.L.L.C.

(57) ABSTRACT

A method for making a cut and puncture resistant laminated fabric under a laminating pressure including the steps of rolling a thermoplastic film and a fabric constructed with a substantial majority of a high performance fiber around a small diameter core to form a wound bundle. The wound bundle is heated at a temperature of between about 250 and about 285 degrees Fahrenheit for a sufficient length of time to laminate the thermoplastic film to the fabric.

28 Claims, 1 Drawing Sheet

METHOD OF MAKING A CUT AND ABRASION RESISTANT LAMINATE

RELATED APPLICATIONS

This application is a continuation-in-part of U.S. application Ser. No. 08/957,431, filed Oct. 24, 1997, the content of which is incorporated herein by reference.

FIELD OF THE INVENTION

The present invention relates to cut resistant and abrasion resistant laminates and the process for their production. More particularly, the present invention relates to a method of producing such a laminate by bonding a layer of a thermoplastic film, for example polyethylene or ethylene vinyl acetate (EVA), to a layer of a strong, lightweight fabric constructed of a high performance fiber such as ultra high molecular weight polyethylene fibers.

BACKGROUND OF THE INVENTION

High performance fabrics have been used for a number of applications where tear-resistance, abrasion-resistance, cut- and stab-resistance, and chemical- and cold-resistance are important. As used herein, the term "high performance" refers to fabrics constructed from a group of fibers used to make cut-resistant and abrasion resistant articles such as gloves and aprons. The high strength-to-weight ratios of these fabrics can provide properties having significant improvements in the performance characteristics stated above at a fraction of the weight of other alternatives. It would be desirable to combine the advantages of high performance fabrics with film-laminated fabrics currently used for applications including, but not limited to sail cloth, cargo container covers, side curtains for side-access trucks and bulk mail bags. With the exception of sail cloth, these items typically are constructed from vinyl-coated nylon or similar materials which do not exhibit these high performance characteristics. The vinyl coating is provided for the purpose of creating an impervious barrier to air and fluid penetration. The disadvantages of currently available vinyl-coated nylon or polyester fabric materials is their relative lack of durability and relatively higher weight per unit area. Thus, it would be desirable to take advantage of the high strength and low weight characteristics of high performance fabrics for these applications. A successful lamination process for these fabrics would enhance their abrasion resistance. It is believed that to date no successful process has been developed for the economical lamination of high performance fabrics with a thermoplastic film such as polyethylene or EVA to create a more durable, waterproof, cut and wear resistant flexible laminate.

Numerous attempts have been made to adhere a polyethylene film to a high performance fabric such as a fabric constructed from yarns made up of high strength, ultra high molecular weight polyethylene yarn. A typical example of such a yarn and fabric is Spectra® brand fiber available from Allied Signal. This fiber is also sometimes described as being constructed from an extended chain polyethylene. In the more than ten years since the initial introduction of Spectra fiber, it is believed that no commercially viable process for laminating a polyethylene film to a fabric constructed from Spectra fiber has been developed. There are believed to be several reasons for this result. High molecular polyethylene fibers lose significant strength if exposed to temperatures in the range of about 230–240° F. and higher when the fibers are unconstrained. The loss of fiber properties is a function of both the temperature and the time that the fiber is held at that temperature. Additionally, the temperature range and time required to adhere the polyethylene film to the high performance fiber significantly exceeds the time/temperature exposure required to degrade the unconstrained fiber. Moreover, high strength, high modulus polyethylene fibers shrink significantly with exposure to heat if not tightly constrained. This shrinkage is well in excess of five percent and can result in stretches in the fabric that cause permanent and severe creases to the point that the resulting laminate is not commercially usable.

There is a need then for a process that securely and reliably bonds a thermoplastic film having an ethylene content of at least about 20 percent to a fabric formed of high performance fibers with the application of heat but in a manner that maintains the properties of the high performance fiber.

SUMMARY OF THE INVENTION

The present invention solves the problems previously attendant to the lamination of thermoplastic films to fabrics constructed with a substantial percentage (greater than 25%) of high performance fibers such as high tenacity, high modulus, ultrahigh molecular weight polyethylene fibers.

The solution involves rolling a thermoplastic film having an ethylene content of at least about 20% and the high performance fiber fabric together under tension to form a wound bundle; and heating the wound bundle at a sufficient temperature and for a sufficient length of time so as to soften the thermoplastic film such that shrinkage of the high performance fabric generates the laminating pressure to laminate said thermoplastic film to said high performance fabric.

This technique results in a flexible, cut and abrasion resistant, substantially air and liquid impervious laminate including a woven fabric including warp yarns and weft yarns wherein the warp yarns are comprised of an ultra high molecular weight polyethylene; and a laminating layer comprised of low density polyethylene film.

In an alternative embodiment, a substantially air and liquid impervious laminate comprised of a first outer layer comprising a laminate of a woven high performance fabric and a thermoplastic film comprised of low density polyethylene is placed on either side of an intermediate layer comprising a scrim fabric. The thermoplastic films of the first and second outer layers face the intermediate layer. Again, the three layers are tightly wound and heated to form a unitary, three-layer laminated film.

Thus one aspect of the present invention is to provide an economical method for laminating a thermoplastic film and a high performance fabric together.

Another aspect of the present invention is to provide a method for making such a laminated lightweight sheet material without losing the strength, or degrading the fiber in the high performance material.

These and other aspects of the present invention will become apparent to those skilled in the art after a reading of the following description of the preferred embodiments when considered in conjunction with the drawings.

DETAILED DESCRIPTION OF THE PREFERRED EMBODIMENTS

Figure 1:
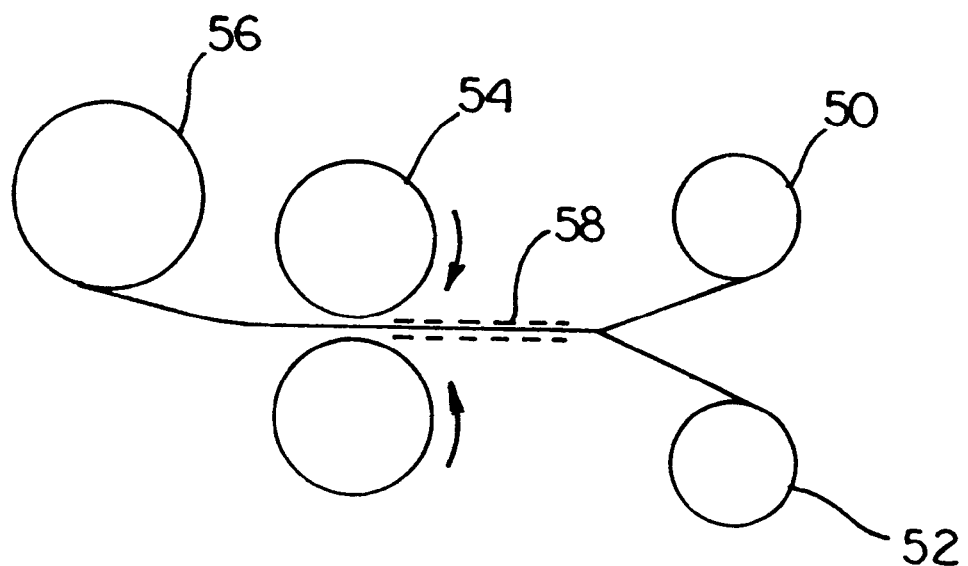
FIG. 1 is a schematic representation of an alternative lamination process wherein the laminate and fabric are wound tightly around a core.

As used herein, the term "fabric" includes plain weave fabrics constructed using convention weaving techniques.

The term "fiber" as used herein refers to a fundamental component used in the assembly of yarns and fabrics. Generally a fiber is a component which has a length dimension which is much greater than its diameter or width. This term includes monofilament, multi-filament, ribbon, strip, staple, and other forms of chopped, cut or discontinuous fiber and the like having a regular or irregular cross-section. "Fiber" also includes a plurality of any one of the above or a combination of the above.

As used herein the term "high performance fiber" means that class of fibers having high values of tenacity (greater than 7 g/d) such that they lend themselves for applications where high abrasion and/or cut resistance is important. Typically, high performance fibers have a very high degree of molecular orientation and crystallinity in the final fiber structure.

As used herein the term "high performance fabric" means a fabric constructed using a high performance fiber as a major constituent of the fabric such that the fabric enjoys the performance benefits of the high performance fabric. Thus, a fabric constructed of 100% high performance fiber is a high performance fabric. Depending on the construction of the high performance fabric, however, a "major constituent" of high performance fiber may comprise less than a majority of the fiber in the fabric. As discussed in more detail below, a woven fabric in which at least about 50 percent of the warp yarns are comprised of a suitable high performance fiber meets this definition for the purposes of the present invention. The remaining warp yarns and the fill yarns may be comprised of any other suitable material that is compatible with the practice of the present invention.

The cross-sectional shapes of fibers suitable for the practice of the present invention include circular, flat or oblong. They may also be of irregular or regular multi-global cross-section having one or more regular or irregular lobes projecting from the linear or longitudinal axis of the filament.

As used herein the terms laminate and laminating refer to the application of a flexible film to a fabric construction to form a lasting bond that will hold up to rough usage without delamination.

It has been found that polyethylene and ethylene vinyl acetate (EVA) films adhere well to fabrics constructed from high performance polyethylene fibers without the use of a bonding agent under appropriate laminating conditions. While the actual mechanism of bonding has not been identified, it is believed to involve more than the forcing of the film into the interstices of the fabric construction. Polyethylene films applied to fabrics constructed from high performance polyethylene fibers adhere sufficiently so that the force required to remove the film from the fabric exceeds the strength of the film. After initial lamination, continued heat treatment improves the adhesion, suggesting that the lower density polyethylene film is diffusing into the crystalline structure of the high performance fibers. It is believed that a thermoplastic film having an ethylene content of at least about 20% will bond to high performance polyethylene fiber fabrics.

The adhesion of the EVA film to the fabric is more difficult to characterize due to the low strength of the film. It may be similar to that of the polyethylene film because of the ethylene content of the film. However, the EVA film tears when an attempt is made to determine the strength with which the film is adhered to the fabric even when one edge of the film protrudes past the fabric edge.

As an additional benefit, the film can be pigmented to provide a color to one side of the fabric or the film can be used as the substrate in the normal processes for printing on polyethylene film.

It is believed that polyethylene or EVA films will not adhere satisfactorily to woven fabrics constructed from aramid or liquid crystal polymer high performance fibers according to the practice of the present invention. This is because these fibers do not shrink significantly when heated. Attempts to create a polyethylene or EVA laminated product using those fabric fibers in a woven fabric construction have been unsuccessful with the film delaminating as a continuous layer after working a section of the film free from the fabric by mechanical action such as rubbing or twisting the laminate.

Suitable high tenacity, high modulus fibers are solution-drawn, ultrahigh molecular weight (UHWM) polyethylene fibers, such as those sold under the brand names Spectra®, Dyneema® and Tekmilon®. Further it is believed that melt spun polyethylene fibers with a tenacity of 15 grams per denier, such as Certran® fibers, can be laminated but may not provide the same film adhesion.

Any suitable polyethylene or EVA film can be used as the laminating film. High-density polyethylene, low-density polyethylene and linear low-density polyethylene are suitable for use in the practice of the present invention. Low-density polyethylene and EVA films loaded with fire retardant and low density films with pigments have been used also. As illustrated in the examples below, the time and temperature required for lamination vary for each of the films.

The method for the lamination of the film to the fiber construction is through the application of heat and pressure to the film/fabric for a given time. The pressure applied results from the combination of rolling the fabric and film into a tight roll and pressure generated by the shrinkage of fabric fibers during heating. Temperatures may vary between about 200° F. and about 275° F. depending on the type of thermoplastic film used. Process time may vary from about 8 hours to about 20 hours. As the process temperature is increased, process time is reduced. Conversely, at lower process temperatures, the time required to create a usable film to fabric bond increases rapidly. The minimum acceptable temperature is that sufficient to soften the thermoplastic film and to cause shrinkage of the high performance fabric so as to generate a laminating pressure.

The lamination process of the present invention may be conducted using a three-step process as illustrated in FIG. 1. The first step includes first tacking the thermoplastic film 50 to the fabric construction 52 on a continuous basis using a heated calendar roll 54 to form a lightly laminated material. After this step, the film is adhered to the fabric uniformly but can be separated therefrom easily. In this condition the laminated material is not suitable for the proposed end uses contemplated for the present invention. A release paper 58 may be used if desired. A suitable machine is the Van Vlandrin Silk Calender with a husk soft roll and a heated steel center roll. Older versions of this machine are steam heated and have provision for modifying the amount of pressure applied to the film/fabric combination. After the tacking step, the continuous roll is wound tightly into a bundle 56 with appropriate release paper and secured with heat resistant tape. In this example, the release paper 310 is positioned so as to be directly adjacent the paper core 300 during windup. Alternatively, the release paper may be placed outside the film 311 and fabric 312 without any substantial effect on the finished laminate. Some differences in the appearance of the finished laminate may be noticed. Next, the bundle is baked in an oven for between about 2 hours and about 5 hours at a temperature between about 200 degrees Fahrenheit and about 275 degrees Fahrenheit. In this embodiment pressure is applied to the film/fabric in two steps, first at a moderate temperature and a relatively high pressure for a short duration, i.e. the time spent in the calender roll, to tack the film to the fabric and second at a much lower pressure, as described above, for a much longer duration.

Figure 2:
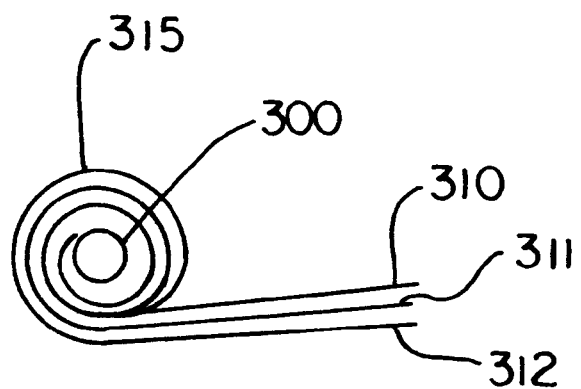
FIG. 2 is a schematic representation of a preferred embodiment of the present invention.

In a preferred embodiment illustrated in FIG. 2 the fabric 312 and film 311 are tightly rolled onto a paper core 300 having a diameter of between about 2 to 6 inches with a release paper 310 to form a bundle 315. Desirably, the fabric 312 and film 311 are arranged so that the fabric 312 is positioned outwardly of the film. This is so that the force generated by the shrinkage of the fabric during heating will force the two components into laminating contact. It is believed that, although reversing the position of the fabric and film may be acceptable, the better performance is achieved using the arrangement described above. The resulting bundle 315 is then secured with a tape capable of withstanding the laminating temperature. The wound bundle 315 is then heated to about between 240° F. and about 280° F. for a period of between about 8 hours and about 18 hours. Preferably, the heat treatment is conducted at a temperature of about 265° F. for about 18 hours. Here the primary laminating pressure is applied to the bundle by the fabric shrinkage that occurs during heating. The exact amount of pressure is unknown but is believed to be under 50 psi. Extra pressure beyond that generated by the act of forming the bundle may be applied during the heat treatment but is not required for acceptable results.

The laminates of the present invention may also be made using machines designed for other purposes. By way of non-limiting example, the apparatus disclosed in U.S. Pat. No. 5,401,344 to Dickson et al. for producing rolls of wrinkle free composite sheet material may be used. Dickson discloses a curing apparatus including a cylinder with an internally lined inflatable bladder. The cylinder is adaptable to be moved into surrounding relation with a sheet material. A forming roll is arranged to supply heat from the interior of the assembled wraps of material while the surrounding inflated bladder exerts pressure to cure a ballistics-type material over a pre-determined cure cycle. The practice of the present invention does not involve a "curing" time per se. However, the ability to provide a controlled heating step and wrinkle-free final product are useful for the practice of the present invention. The content of the Dickson patent is incorporated herein by reference in its entirety.

The following examples demonstrate the advantages and unexpected results of the present invention. The specific process parameters, i.e., temperature, pressure, time and materials illustrate the invention in an exemplary fashion and should not be construed as limiting the scope of the invention. Except as otherwise noted below, the fabric in each of the examples is constructed using 100% high performance fiber. The style designations used in the examples are well-known product references commonly used in the art. In certain of the examples the thermoplastic film and the high performance fabric are rolled together under tension using a modified pattern machine. The pattern machine is an Econo-Copier/2000 manufactured by Perforated Pattern, Co., Inc. This machine was not designed for use in a laminating process, but rather typically is used to transfer a print pattern onto long paper rolls. The resulting patterns are then used for high volume cloth-cutting operations for clothing manufacture. The machine was modified by removing certain of the pressure rollers necessary for processing rolls of paper. The remaining components included three feed rolls and one wind-up roll. Each of these rolls has provision for individual tension adjustment. Other rollers may be present on the machine, but are not used in the practice of the present invention.

EXAMPLE 1

A 16 inch wide by 56 inch long strip of fabric formed from Allied Signal's Spectra® high performance polyethylene fiber, style 904, and an 8 mil thick low density polyethylene film produced by Blueridge Films and a 0.5 mil polyester release paper were hand rolled together. The tightly wound roll was wrapped with heat resistant tape and heated in an oven at 250 degrees Fahrenheit for seven hours. When the bundle was removed from the oven, it was observed that the film had adhered to the fabric with a strength that exceeded the strength of the film. The film could not be removed from the fabric with simple mechanical action. Additionally, the finished product exhibited a permanent texture resulting from the compression of the fabric layers making up the bundle. The texture is preferred for some applications as it increases flexibility, hides defects and imparts an aesthetically pleasing surface to the film side of the laminate.

EXAMPLE 2

An 8 mil EVA film manufactured by Deerfield Urethane, Inc. was laminated to a 12-inch×12 inch-fabric sample made from Allied Signal's Spectra® 900 high performance polyethylene fiber. The yarn was 1200 denier by weight and the fabric construction was 17×17 plain weave construction, style 902. The film was initially tacked to the fabric using a hand iron and the resulting laminate was heated in an oven for three hours at 220° F. Film adhesion to the fabric exceeded the strength of the film.

EXAMPLE 3

An 8 mil EVA film manufactured by Deerfield Urethane, Inc. was laminated to a fabric made from Allied Signal's Spectra® 900 high performance polyethylene fiber. The yarn was 650 denier by weight and the fabric construction was 34×34 plain weave construction, style 904. The fabric and film were laminated in the equipment described in the Dickson et al patent at 265° F. and 150 PSI. The film adhered well to the fabric and could not be removed. The fabric size for this sample was 56 inches wide by 20 yards long.

EXAMPLE 4

A Spectral fabric, style 902, and an 8 mil. thick, low density polyethylene film produced by Blueridge Films, Inc. were laminated together in the equipment described in the Dickson et al. patent at 265° F. and 150 PSI. The film adhered well to the fabric and could not be removed. The fabric size for this sample was 56 inches wide by 10 yards long.

EXAMPLE 5

An 8 mil EVA film manufactured by Deerfield Urethane, Inc. was laminated to a fabric made from Allied Signal's Spectra® 900 high performance polyethylene fiber. The yarn was 650 denier by weight and the fabric and film along with a 0.5 mil. polyester release film were hand rolled on a cardboard tube. Hand tension was maintained on the fabric and the release paper while the tube was rolled by a third individual. The completed rolled was taped with high temperature tape and the roll was heated at 250° F. for 4.5 hours. The film could not be removed from the fabric after the heat soak. The fabric size for this sample was 56 inches wide by 16 inches long.

EXAMPLES 6–12

Larger scale production of laminated products according to the present invention is illustrated in examples 6–12 in Table 1 below. Most of the examples in Table 1 were constructed with a 56-inch wide, 30-foot long section of fabric formed from Spectrag® 900 high performance polyethylene fiber. Examples 8 and 9 used a different fabric as described below. The fabric was either a 17×17, 34×34 or 56×56 plain weave. The fabric was wound tightly with sheets of low density polyethylene (LDPE) or ethylene vinyl acetate (EVA) film along with a release paper using the modified pattern machine. The 7 mil and 8 mil thick LDPE films were heavily pigmented with carbon black. The release paper was either a 0.5 mil polyester or a 0.5 mil silicone treated polyester. The rolled bundle was secured using a heat resistant tape and oven heated using the temperatures and times indicated in Table 1.

TABLE I

Comparative Film/Fabric Examples

| Exp | Film | Fabric | Temp (° F.) | Time | Comments |
|---|---|---|---|---|---|
| 6 | LDPE 5 mil | Spectra ® 900 650 denier | 265 | 18 hrs | |
| 7 | LDPE 7 mil | Spectra ® 900 650 denier | 265 | 18 hrs | |
| 8 | LDPE 3 mil | Spectra ® 900 650 denier Polyester 500 denier | 265 | 18 hrs | Spectra fiber used in warp direction only |
| 9 | LDPE 3 mil | Spectra ® 900 650 denier Polyester 500 denier | 265 | 18 hrs | Laminate of 2 sheets made according to example 3 |
| 10 | EVA 8 mil | Spectra ® 900 650 denier | 265 | 18 hrs | |
| 11 | LDPE 2 mil | Spectra ® 1000 215 denier | 265 | 18 hrs | |
| 12 | LDPE 7 mil | Spectra ® 900 1200 denier | 265 | 18 hrs | |

In each of examples 6–12 the film had adhered to the fabric with a strength that exceeded the strength of the film. The film could not be removed from the fabric by vigorous flexing and/or rubbing. The finished product exhibit a permanent textured surface appearance resulting from the shrinkage of the fabric and the movement of the film into the spaces between the yarns in the fabric. This texture is preferred for the reasons discussed above. The fabric exhibited some amount of shrinkage in both the fill and warp directions as shown in the table. In most cases the tensile strength of the fabric in both the fill and warp directions increased. However, for examples 11 and 12 there was a decrease in this physical property, which is believed to be attributable to the loose, weave of the yarn and the inability of the fabric to shrink to the maximum tightness possible. Additionally, in example 12, it is believed that the thickness of the film used may also have contributed to the loss of tensile strength. Nevertheless, these laminates are acceptable for the uses contemplated for the present invention.

Based on the above results it is believed that a low density polyethylene film can be laminated to high performance polyethylene based fabrics. Some decrease in laminate properties is observed when the film thickness is increased to 7 mils. Because the polyethylene film migrates into the fabric during the heating step, the amount that the diameter of the tightly wound roll decreases during heating increases as film thickness increases. It is surmised that the amount the warp yarns will shrink to maintain adequate tension in fiber properties exceeds the amount that can occur before the fiber properties degrade. With respect an EVA film, it is believed that a film thickness of 8 mils or less is suitable. Additionally, it is believed that much thicker EVA films may be laminated successfully.

With reference to FIG. 3, the laminate in Example 9 was constructed from two sheets of the laminated fabric produced according to Example 8. The Example 9 laminate is a three-layer structure having two outside layers and an intermediate layer positioned therebetween. Each of the outside layers is comprised of a high performance fabric 62 with a thermoplastic film 64 laminated thereon. A scrim fabric 70 is positioned between the two outer layers 60. The scrim is available from Bayex, a division of Bay Mills Limited, and is comprised of a 375 denier Spectra 1000 yarn laid in a 45°, −45° pattern on 0.25 inch centers. The scrim further included a 50 denier polyester component woven on 0.25-inch centers. The three layers were rolled together tightly using the modified pattern machine. The film sides of each layer 60 point inwardly toward the center of the multi layer structure. After the heating step, it was noted that the resulting laminate exhibited an additional 1.5 percent for shrinkage in the warp direction. This laminate was particularly resistant to ice pick and knife penetration. It is believed that this laminate is particularly suitable for use as a sail cloth.

It has been found that the fabric used to make laminates according to the present invention need not be constructed from 100% high performance fiber. The fabric desirably should contain warp yarns comprised of a high performance fiber, preferably an ultra high molecular weight polyethylene. The shrinkage of the warp yarns in the warp direction creates the laminating pressure. The fabric used in Examples 8 and 9 is produced by North Cloth and includes Spectra high performance yarns only in the warp direction at approximately 35 yarns per inch. The fill yarn was a 500 denier polyester used at a rate of approximately 35 picks per inch. Based on the experiments with this fabric, it is believed a similar fabric in which such high performance fiber makes up 50% of the warp yarns would provide satisfactory performance. It will be appreciated that reducing the content of the high performance fiber in the fabric reduces the cost of the laminate accordingly.

EXAMPLES 13–16

Table 2 illustrates the results of comparative heating time testing conducted to determine compare the effect of a variety of heating times. In each of examples 13–16 heating oven air circulation fans were allowed to run after the heating cycle until the temperature of the recirculating air reached 120° F. The test data indicate that for a heating temperature of 265° F. a heating period of about 8 hours is desirable. It is believed that at lowered temperatures more than 8 hours would be required to obtain acceptable film to fabric adhesion.

TABLE 2

Comparison of Heating Times

| Exp | Film | Fabric | Temp (° F.) | Time | Results |
|-----|------|--------|-------------|------|---------|
| 13 | LDPE 3 mil | Spectra 900 32 × 32 Plain weave 650 denier | 265 | 2 hrs | Some tacking; film could be separated from fabric easily. |
| 14 | LDPE 3 mil | Spectra 900 32 × 32 Plain weave 650 denier | 265 | 4 hrs | Better tacking but could be separated from fabric after vigorous flexing of laminate. |
| 15 | LDPE 3 mil | Spectra 900 32 × 32 Plain weave 650 denier | 265 | 6 hrs | Film very well tacked to fabric but could be removed from fabric in strips located along diagonal lines along fabric. |
| 16 | LDPE 3 mil | Spectra 900 32 × 32 Plain weave 650 denier | 265 | 8 hrs | Good adhesion of film to fabric and minimum acceptable visual appearance. Presented diagonal stripes, but striped areas were well adhered. |

EXAMPLES 17–19

A similar trial of experiments was conducted to compare the effectiveness of a variety of heating temperatures for laminating EVA film to a high performance fabric. The fabric laminated was 16 inches in length and 56 inches in width. Those results are summarized in Table 3 below.

TABLE 3

Comparison of Heating Times

| Exp | Film | Fabric | Temp (° F.) | Time | Results |
|-----|------|--------|-------------|------|---------|
| 17 | EVA 8 mil | Spectra 900 Style 904 | 210 | 18 hrs | Film was adhered to fabric; surface appearance acceptable |
| 18 | EVA 8 mil | Spectra 900 Style 904 | 200 | 20 hrs | Film adhesion marginal; surface appearance acceptable |
| 19 | EVA 8 mil | Spectra 900 Style 904 | 190 | 18 hrs | Film was adhered to fabric but could be removed as a continuous sheet |

EXAMPLE 20

An additional EVA laminate was constructed using an 8 mil EVA film manufactured by Deerfield Urethane and a fabric formed from AlliedSignal's Spectra fiber, style 904, woven from 650 denier Spectra 900 fiber. The fabric was 10 yards in length. These components were wound tightly on a paper core along with a ½ mil Mylar release film. The resulting roll was maintained under tension as it was secured with a suitable tape. The roll was heated at 275° F. for 18 hours. The film was uniformly laminated to the fabric and the resulting laminate appeared to have more uniform surface features.

Additional experimentation has revealed that 275° F. is a preferred laminating temperature for EVA films as it provides better surface features in the finished product. However, it should be understood that what constitutes a "desirable" surface effect can be a subjective determination.

Thus, the practice of the present invention includes varying the lamination temperature and duration to modify the surface appearance of the final laminate.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims and their equivalents.

What is claimed is:

1. A method for making a cut and puncture resistant laminated fabric under a laminating pressure comprising:
    a) rolling a thermoplastic film having at least about 20% ethylene content and a fabric comprised of a high performance fiber together under tension to form a wound bundle; and
    b) heating the wound bundle at a sufficient temperature and for a sufficient length of time so as to soften the thermoplastic film such that shrinkage of the high performance fabric generates the laminating pressure to laminate said thermoplastic film to said high performance fabric.

2. The method of claim 1 further comprising tacking the thermoplastic film and the fabric together so as to be lightly adhered prior to the step of rolling the thermoplastic film and the fabric together.

3. The method of claim 1 further comprising providing a release paper in said wound bundle so as to provide separation between film layers in the bundle.

4. The method of claim 1 wherein said thermoplastic film is comprised of the material selected from the group consisting of low density polyethylene and ethylene vinyl acetate.

5. The method of claim 1 wherein said thermoplastic film has a thickness between about 3 mils and 8 mils.

6. The method of claim 1 wherein said high performance fiber is comprised of extended chain polyethylene.

7. The method of claim 1 wherein the heating of the wound bundle is conducted at a temperature between about 250° F. and 285° F.

8. The method of claim 1 wherein heating the wound bundle is conducted at a temperature of about 265° F.

9. The method of claim 1 wherein the step of heating the wound bundle is conducted for between about 8 hours and about 18 hours.

10. The method of claim 1 wherein the step of heating the wound bundle is conducted for about 8 hours.

11. The method of claim 1 wherein said thermoplastic film is comprised of ethylene vinyl acetate and said step of heating the wound bundle is conducted at a temperature of about 250° F. for about 8 hours.

12. The method of claim 1 wherein said thermoplastic film is comprised of ethylene vinyl acetate and said step of heating the wound bundle is conducted at a temperature of between about 200° F. and 275° F. for about 18 hours.

13. The method of claim 1 wherein said thermoplastic film is comprised of low density polyethylene and said step of heating the wound bundle is conducted at a temperature of about 265° F. for about 8 hours.

14. The method of claim 1 wherein said thermoplastic film and said fabric are rolled together around a core.

15. The method of claim 14 wherein said core has a diameter between about 2 inches and 6 inches.

16. The method of claim 1 wherein said fabric is a woven fabric.

17. The method of claim 16 wherein said woven fabric is comprised of warp yarns and fill yarns wherein said high performance fiber in said fabric is contained in said warp yarns.

18. The method of claim 17 wherein about 50 percent of said warp yarns are comprised of high performance fiber.

19. The method of claim 1 wherein said thermoplastic film is comprised of low density polyethylene and said step of heating the wound bundle is conducted at a temperature of 265° F. for between about 8 hours and about 18 hours.

20. The method of claim 19 wherein the step of heating the wound bundle is conducted for about 8 hours.

21. A method for making a cut and puncture resistant laminate under a laminating pressure comprising:
   a) rolling a thermoplastic film and a fabric constructed with a substantial majority of a high performance fiber around a small diameter core to form a wound bundle; and
   b) heating the wound bundle at a temperature of between about 250 and about 285° F. for a sufficient length of time so as to soften the thermoplastic film such that shrinkage of the high performance fibers generates the laminating pressure to laminate said thermoplastic film to said fabric.

22. The method of claim 21 wherein the step of heating the wound bundle is conducted for between about 8 hours and 18 hours.

23. The method of claim 21 wherein the step of heating the wound bundle is conducted for about 8 hours.

24. The method of claim 21 wherein said fabric is a woven fabric including warp yarns and fill yarns.

25. The method of claim 24 wherein said warp yarns are comprised of a high performance fiber.

26. The method of claim 21 wherein said thermoplastic film is comprised of a material selected from the group consisting of low density polyethylene and ethylene vinyl acetate, said thermoplastic film has a thickness in the range of about 3 mils to 8 mils, said fabric is woven, said high performance fiber is ultra-high molecular weight polyethylene, and said core has a diameter in the range of about 2 to 6 inches.

27. The method of claim 26 wherein said high performance fibers are in the warp yarns.

28. The method of claim 26 wherein said fabric is positioned outwardly of the thermoplastic film on said core, whereby the shrinkage of the high performance fibers generates a laminating pressure.

* * * * *